(12) United States Patent
Wang et al.

(10) Patent No.: US 11,256,952 B2
(45) Date of Patent: Feb. 22, 2022

(54) IMAGE PRIVACY PERCEPTION METHOD BASED ON DEEP LEARNING

(71) Applicant: Harbin Institute of Technology Shenzhen Graduate School, Shenzhen (CN)

(72) Inventors: Hongpeng Wang, Shenzhen (CN); Yang Zhang, Shenzhen (CN); Lei You, Shenzhen (CN); Huamen He, Shenzhen (CN); Xingsen Huang, Shenzhen (CN)

(73) Assignee: Harbin Institute of Technology Shenzhen Graduate School, Guangdong (CN)

( * ) Notice: Subject to any disclaimer, the term of this patent is extended or adjusted under 35 U.S.C. 154(b) by 643 days.

(21) Appl. No.: 16/099,836

(22) PCT Filed: Nov. 27, 2017

(86) PCT No.: PCT/CN2017/113068
§ 371 (c)(1),
(2) Date: Nov. 8, 2018

(87) PCT Pub. No.: WO2019/071754
PCT Pub. Date: Apr. 18, 2019

(65) Prior Publication Data
US 2021/0224586 A1 Jul. 22, 2021

(30) Foreign Application Priority Data
Oct. 9, 2017 (CN) .......................... 201710928967X

(51) Int. Cl.
*G06K 9/62* (2006.01)
*G06F 21/62* (2013.01)
(Continued)

(52) U.S. Cl.
CPC ....... *G06K 9/6228* (2013.01); *G06F 21/6245* (2013.01); *G06K 9/38* (2013.01);
(Continued)

(58) Field of Classification Search
CPC ...... G06K 9/6228; G06K 9/38; G06K 9/6232; G06K 9/6257; G06K 9/6267; G06K 9/629; G06F 21/6245; G06N 3/08
See application file for complete search history.

(56) References Cited

U.S. PATENT DOCUMENTS

2017/0024641 A1* 1/2017 Wierzynski .......... G06K 9/4628
2017/0220816 A1* 8/2017 Matusek .......... G08B 13/19686

FOREIGN PATENT DOCUMENTS

CN 106295584 A * 1/2017 ......... G06K 9/00228

\* cited by examiner

*Primary Examiner* — Casey L Kretzer
(74) *Attorney, Agent, or Firm* — JCIP Global Inc.

(57) ABSTRACT

An image privacy perception method based on deep learning, including the following steps: S1, building a privacy classification data set with labeled categories, and training a privacy perception network with a transfer learning method; S2, recognizing a privacy image using a deep convolutional neural network oriented to privacy perception; and S3, extracting an attention profile according to deep convolutional features of the neural network, and locating an attention focusing region to complete the perception of an image privacy region. The method has the following beneficial effects: by completing end-to-end training and testing based on the deep neural network, the privacy image can be accurately distinguished with the privacy region located, facilitating the selective protection of the privacy information in the image.

8 Claims, 2 Drawing Sheets

(51) Int. Cl.
*G06K 9/38* (2006.01)
*G06N 3/08* (2006.01)
(52) U.S. Cl.
CPC ........... *G06K 9/629* (2013.01); *G06K 9/6232* (2013.01); *G06K 9/6257* (2013.01); *G06K 9/6267* (2013.01); *G06N 3/08* (2013.01)

IMAGE PRIVACY PERCEPTION METHOD BASED ON DEEP LEARNING

FIELD

The invention relates to artificial intelligence, in particular to an image privacy perception method based on deep learning.

BACKGROUND

Privacy perception is an important prerequisite in the privacy protection process, images are one of the most important types of information in current social networks, and thus, it is especially critical to conduct privacy perception on massive image data. In view of the strong subjectivity of the concept of privacy, the existing image privacy perception methods usually define the image privacy (such as personal identifications, family photos, confidential file snapshots, etc.) in a general sense at first or make use of individual annotations made by a user in the social network. The existing methods mainly have the following disadvantages.

First, in respect of the feature extraction of privacy images, most of the existing methods take advantage of the traditional image feature extraction methods, such as SIFT features, RGB features, color histograms, etc., which have certain limitations in feature expression capability and cannot represent the features at a deep semantic level, with poor generalization capacity of a classification model.

Second, to achieve an acceptable perception effect, some of the current image privacy perception methods require additional information, such as image description tags subjectively labeled by the user or user-defined access control policies, however, this information is difficult to obtain in most cases, the requirements for the application scenario are also harsh, and the model has poor versatility.

Third, with the existing image privacy perception methods, the privacy perception is completed at an image level only, i.e. distinguishing whether the entire image is a privacy image, without any perception of the image privacy region. However, to achieve the purpose of privacy protection, it is sometimes necessary to cover or obscure the privacy region of the image in practical applications.

SUMMARY

To solve the problems in the prior art, the invention provides an image privacy perception method based on deep learning.

The invention provides an image privacy perception method based on deep learning, comprising the following steps:

S1, building a privacy classification data set with labeled categories, and training a privacy perception network with a transfer learning method;

S2, recognizing a privacy image using a deep convolutional neural network oriented to privacy perception; and S3, extracting an attention profile according to deep convolutional features of the neural network, and locating an attention focusing region to complete the perception of an image privacy region.

As a further improvement of the invention, S1 comprises: first pre-training a deep convolutional neural network model over a large-scale image data set, then building the privacy classification data set, and fine-tuning the pre-trained deep convolutional neural network model over the privacy classification data set.

As a further improvement of the invention, S2 comprises: adding a bilinear operation layer posterior to a last convolutional layer of the deep convolutional neural network to enhance the feature expressing capability of the deep convolutional neural network model, and meanwhile changing a fully connected layer into a pooling layer.

As a further improvement of the invention, S3 comprises: obtaining a weighted high level feature map as the attention profile according to a correspondence between the weight of each node of the pooling layer and feature maps subjected to bilinear operation, and locating privacy regions in the original maps through scale changing.

As a further improvement of the invention, the bilinear operation layer mainly calculates a dot product of every two convoluted feature maps, supposing an original feature map set $M=\{m_1, m_2, \ldots, m_n\}$, and an output bilinear feature map set $=M'=\{m'_1, m'_2, \ldots, m'_{n \times n}\}$, then a conversion formula is:

$$m'_i = m_{\lceil i/n \rceil} \circ m_{i-(\lceil i/n \rceil - 1) \times n} \quad (1)$$

wherein "$\circ$" represents the dot product of matrixes, "$\lceil \ \rceil$" represents rounding up to an integer, n indicates the number of the original feature maps, and i indicates a subscript of the bilinear feature map.

As a further improvement of the invention, the bilinear feature maps are subjected to dimensionality reduction.

As a further improvement of the invention, a Tensor Sketch algorithm is used to perform the dimensionality reduction on the bilinear feature maps.

As a further improvement of the invention, the bilinear feature maps are c matrixes of w*h, and with an input of the Tensor Sketch algorithm as a vector, each position in the bilinear feature maps is calculated in turn when using the Tensor Sketch algorithm, that is, w*h c-dimensional vectors are subjected to operation respectively and remapped to a space of w*h*d dimensions; parameter sets $h_k \in \{1, \ldots, d\}^c$, $s_k \in \{1, -1\}^c$ (k=1, 2) are first generated randomly for hash operation, wherein $h_k$ is used for storing an index for remapped input vectors, and $s_k$ accomplishes random negation for each elemental value of the input vectors; according to the parameter sets, a remapped Count Sketch vector is obtained through accumulation; from the convolution theorem, the convolution of a time domain or a spatial domain is known to be equal to a product in a corresponding frequency domain; and thus, two Count Sketch vectors are converted into the frequency domain using the fast Fourier transform to find a product thereof in the frequency domain, and then converted back to the spatial domain through the inverse Fourier transform to calculate the convolution of the Count Sketch vectors.

As a further improvement of the invention, the fully connected layer is changed into an average pooling layer, which pools all of the feature maps and averages the elements in each feature map to obtain a vector of the d-dimension finally.

As a further improvement of the invention, a correspondence exists between nodes of the average pooling layer and the feature maps, which are subjected to weighted summation to obtain the attention profile;

supposing a dimension-reduced bilinear feature diagram sequence $P=\{p_1, p_2, \ldots, p_d\}$, and the finally generated attention profile as A, then a calculation formula thereof is:

$$A = \sum_k w_k^n p_k \qquad (2)$$

wherein n is a category label subordinated to classified input images, and $w_k^n$ indicates a connection weight of a category n corresponding to the $k^{th}$ node of the pooling layer;

the privacy image is locally located according to the results above, to be specific, the attention profile obtained from the steps above is changed in scale and converted into the size of the original profile, a threshold is set to complete image binarization, and a minimal external matrix of the binaryzed image is solved as a local perception result of the privacy image.

The invention has the beneficial effects that by completing end-to-end training and testing based on the deep neural network, the privacy image can be accurately distinguished from the non-privacy image and have the privacy region located to facilitate the selective protection of the privacy information in the image, providing a good prerequisite for the privacy protection process. From the aspect of method advancement, the invention effectively overcomes the problems of low accuracy, poor generalization capability, and dependence on additional information from users in the traditional privacy perception methods, and extends the privacy perception from the overall perception of the image to the perception of the privacy regions of the image, without increasing the training of the neural network model.

DETAILED DESCRIPTION

The invention will be further described below in conjunction with the accompanying drawings and particular embodiments.

Figure 1:
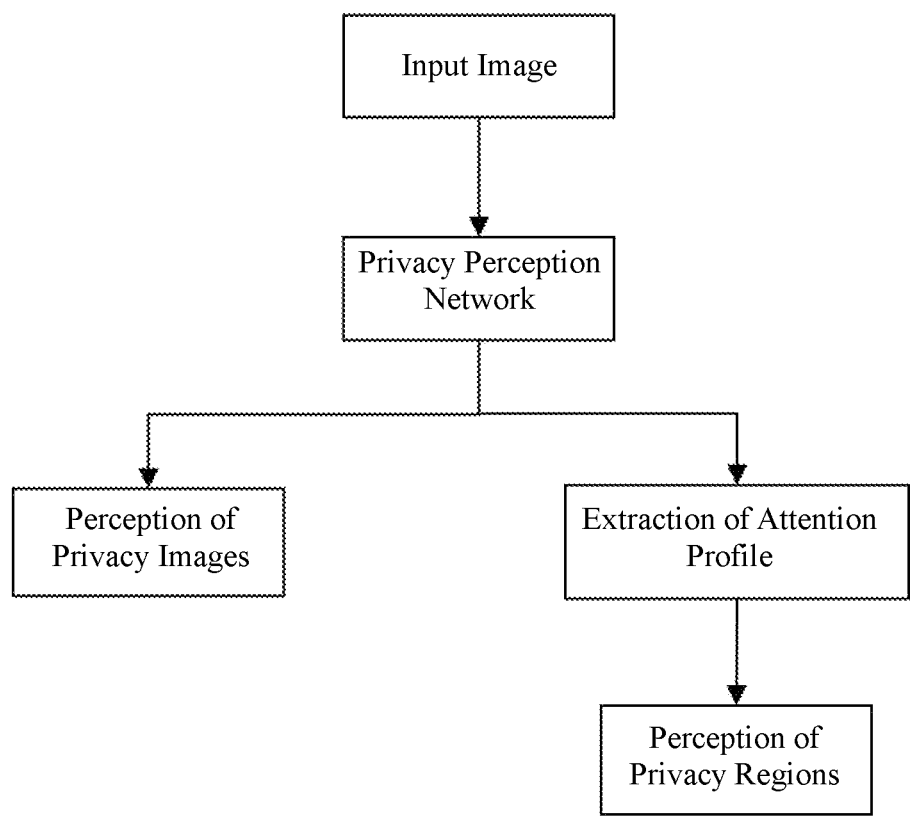
FIG. 1 is a flow chart of an image privacy perception method based on deep learning according to the invention.
Figure 2:
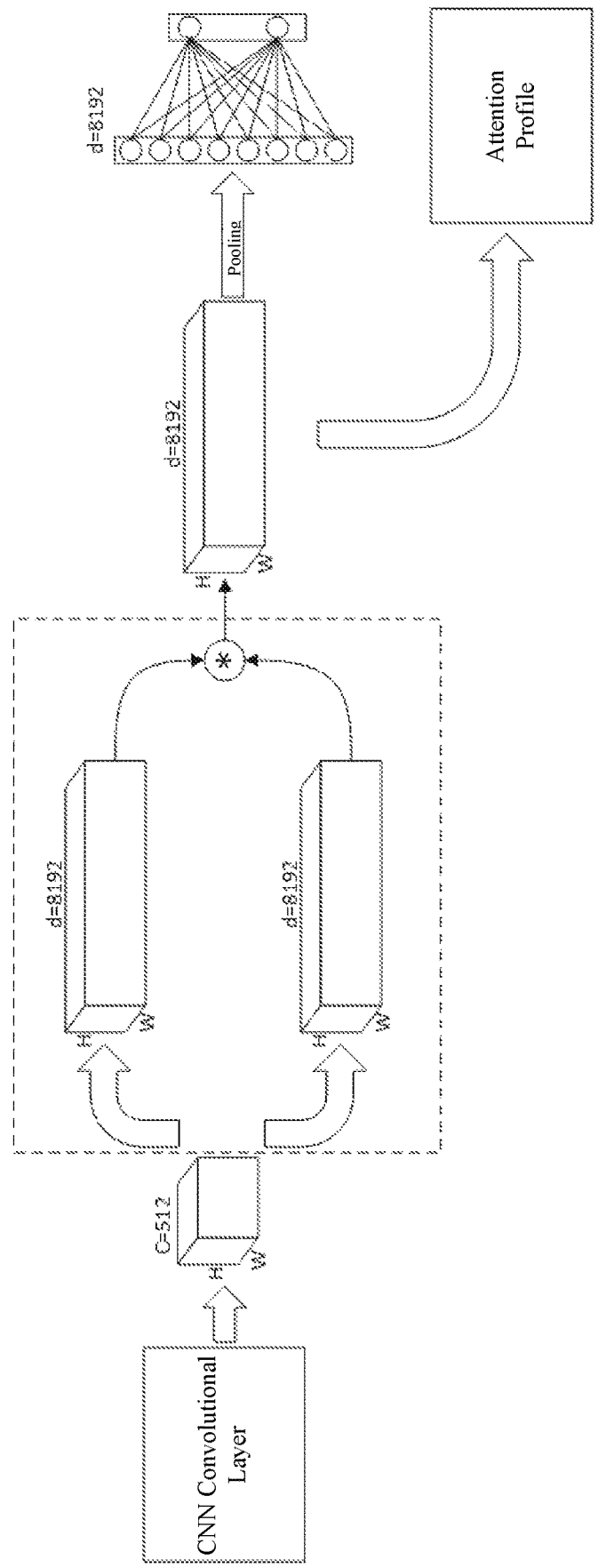
FIG. 2 is a structural diagram of a deep convolutional neural network for the image privacy perception method based on deep learning according to the invention.

As shown in FIG. 1 to FIG. 2, an image privacy perception method based on deep learning mainly comprises the following main steps:

building of a privacy data set: collecting relevant images and labeling the images in terms of privacy and non-privacy;

pre-training of a neural network: training a deep convolutional neural network over a large-scale image data set (for example, ImageNet);

improving and training of the neural network: improving the pre-trained neural network and fine-tuning the same over the privacy image dataset;

overall privacy perception of the images: automatically determining whether an input image is a privacy image;

perception of image privacy regions: automatically detecting privacy regions in the images.

In the step of improving and training of the neural network, the pre-trained convolutional neural network is improved, and a bilinear operation layer is added posterior to the last convolutional layer to enhance the feature expression capability of the model, and a fully connected layer is changed into a pooling layer at the same time, laying a foundation for the privacy region perception.

It is unnecessary to retrain the network for the perception of the image privacy regions. In the invention, a weighted high-level feature map is obtained according to the correspondence between the weight of each node of the pooling layer of the classification network and the feature maps subjected to the bilinear operation, and an attention profile is obtained through scale changing, where attention focusing regions are located as privacy regions.

Each step is implemented as follows.

Building of a privacy data set: to improve the efficiency for building the data set, a keyword search method is used to take the first n images searched from Baidu and Google as candidate images. Keywords mainly relate to categories such as ID photo, family/group photos, and file snapshots. During keyword acquisition, a correlation model capable of calculating inter-word similarity (for example, word2vec and GloVe models subjected to massive corpus training) is used to help generate words similar to the input keywords, thereby increasing privacy keywords and facilitating searching of more images. Then, a small number of images irrelevant to privacy are searched through manual screening, and 4384 privacy images were collected. For non-privacy images, 200 types of common objects are selected from the ImageNet dataset, with 4800 images randomly selected, and these images are divided into a training set and a testing set at the ratio of 1:1 to facilitate the training and testing of the subsequent neural network.

Pre-training of the neural network: the deep convolutional neural network is trained over the ImageNet large-scale image dataset in this step. The ImageNet dataset contains approximately 1.2 million images, covering 1000 types of common objects. The reason for pre-training is that direct training is difficult to converge since the privacy data set is small and the deep convolutional neural network has many parameters. However, if the neural network is pre-trained over a large-scale dataset to obtain a good initial weight and a certain feature expression capability at the same time, the neural network can quickly converge over a small dataset to achieve a better classification effect. The VGG16 convolutional neural network with a better effect at present is used as the pre-trained neural network, which contains 16 convolutional layers and 2 fully connected layers and can achieve good results in general classification tasks.

Improving and training of the neural network: the pre-trained model is first improved and trained over the privacy data set. The main improvements are as follows:

for the pre-trained VGG16 network, a bilinear operation layer is added posterior to the last convolutional layer to enhance the feature expression capability of the model. The bilinear operation layer mainly calculates the dot product of every two of the feature maps, and supposing an original feature map set $M=\{m_1, m_2, \ldots, m_n\}$, and an output bilinear feature image set $M'=\{m'_1, m'_2, \ldots, m'_{n \times n}\}$, the formula for conversion is as follows:

$$m'_i = m_{\lceil i/n \rceil} \circ m_{i-(\lceil i/n \rceil - 1) \times n} \qquad (1)$$

wherein "$\circ$" represents the dot product of matrixes, "$\lceil\ \rceil$" represents rounding up to an integer, n indicates the number of the original feature maps, and i indicates a subscript of the bilinear feature map.

However, during system implementation, the curse of dimensionality will be caused by directly calculating the last layer of convoluted bilinear feature maps. For example, there are 512 feature maps at the last layer of this framework and 512×512 bilinear feature maps found according to the formula (1), resulting in a large amount of subsequent computation overhead, therefore, it is necessary to conduct dimensionality reduction on the bilinear feature maps. In this regard, to reduce the dimensionality for the data, the invention makes use of the Tensor Sketch algorithm (TS algorithm for short) which is a vector outgrowth estimation method based on Count Sketch. The Count Sketch is a data hashing method, which was first mainly used in the mining of frequent item set of data streams and later, was proved by Pham et al. that the outer product of two vectors could be estimated by calculating the convolution of Count Sketch (i.e. the multiplication of every two elements among the vectors).

Since the feature maps mentioned above are c matrixes of w*h, and the input of the TS algorithm is a vector, each position in the feature maps is calculated in turn in the invention when the TS algorithm is used, that is, w*h vectors of c-dimension are subjected to operation respectively and remapped into the space of w*h*d dimensions. First, parameter sets $h_k \in \{1, \ldots, d\}^c$, $s_k \in \{1,-1\}c$ (k=1, 2) for hash operation are randomly generated, wherein $h_k$ is used to store an index for remapped input vectors, and $s_k$ accomplishes random negation for each elemental value of the input vectors. According to the parameter sets, a remapped Count Sketch vector is obtained through accumulation. From the convolution theorem, the convolution of a time domain or a spatial domain is known to be equal to a product in a corresponding frequency domain. Thus, two Count Sketch vectors can be converted into the frequency domain using the fast Fourier transform to find a product thereof in the frequency domain, and then converted back to the spatial domain through the inverse Fourier transform to calculate the convolution of the Count Sketch vectors. The specific algorithm is as follows.

---

Tensor Sketch Algorithm

Input: $x \in R^c$
Output: $\phi_{TS} \in R^d$
1:   for k ← 1,2 do
2:       randomly generate $h_k \in \{1,\ldots,d\}^c$
3:       randomly generate $s_k \in \{1,-1\}^c$
4:   for k ← 1,2 do
5:       initialize $x'_k = [0,\ldots,0]$, $x'_k \in R^d$
6:       for i ← 1,...,c do
7:           $x'_k[h_k[i]] = x[i] + s_k[i] \times x[i]$
8:       $\phi_{TS} = FFT^{-1}(FFT(x'_1) \circ FFT(x'_2))$
9:       return $\phi_{TS}$

---

In addition to the improvement of the above bilinear operation layer, the invention also changes the fully connected layer posterior to the last convolution layer in the original network structure into an average pooling layer, where the entire feature maps are pooled, and the elements of each feature map are averaged to obtain the d-dimensional vectors. The reasons for using the pooling layer instead of the fully connected layer is that the pooling layer has no parameters to learn, which greatly reduces the model parameters, speeds up the convergence, and avoids overfitting to some extent. Meanwhile, the correspondence between the feature maps and the pooled feature vectors is guaranteed, creating conditions for the subsequent extraction of the attention profile.

Overall privacy perception of images: this step is used to automatically identify whether the input image is a privacy image, where the image under test is input into the trained privacy perception network, and whether it is a privacy image is determined according to the subordination probability of each category output by the network.

Perception of image privacy regions: this step is used to automatically detect the privacy regions in the images. An attention profile is mainly extracted through the deep convolutional features of the network, and the attention focusing regions are located to complete the perception of the image privacy regions.

Due to a correspondence between the nodes of the average pooling layer and the feature maps, the attention profile can be obtained by the weighted summation of the feature maps. Supposing a dimension-reduced bilinear feature diagram sequence P={$p_1, p_2, \ldots, p_d$}, and the finally generated attention profile as A, then a calculation formula thereof is:

$$A = \sum_k w_k^n p_k \qquad (2)$$

wherein n is a category label subordinated to classified input images, $w_k^n$ indicates a connection weight of a category n corresponding to the $k^{th}$ node of the pooling layer.

According to the invention, the privacy image is locally located according to the results above, to be specific, the attention profile obtained from the steps above is changed in scale and converted into the size of the original profile. A threshold is set to complete image binarization, and the minimal external matrix of the binaryzed image is solved as a local perception result of the privacy image.

The invention has a broad application scope, for example:

In Solution 1, in social networks, photo sharing has become an increasingly popular form of communication. However, there are certain security risks when users share their photos, for example, many people, especially young people, directly share photos that may reveal personal privacy to social networks without adequate consideration of their own security, some criminals may engage in illegal activities by using this information, which undoubtedly poses a certain security threat to themselves or their relatives and friends. In this regard, if the privacy perception mechanism in the invention is used, the uploader can be informed of the privacy concerned in the photos promptly to play a preventative role. In addition, in some cases, a user wishes to cover or obscure the region involving privacy in the released photo. A lot of manpower and time are required to process the privacy regions, and the method for perception of the image privacy sensitive regions provided by the invention can better solve the above problem by automatically locating the privacy regions in the image, which facilitates subsequent processing and avoids manual operation.

In Solution 2: cloud storage applications have become more and more widely used, and a cloud platform brings together a large number of personal information of the users, which is mostly image data. However, most of the cloud platforms are systems that are not trustworthy, and it is not uncommon for the cloud platforms to leak personal data. In order to protect personal privacy from being leaked, some companies take the advantage of encryption or data perturbation to protect the privacy, but a lot of computing resources are needed when processing all of the large amount of image data. At this point, if the image data is analyzed by using the method mentioned in the invention to distinguish the privacy image or locate the privacy sensitive region at first for conducting the targeted protection, the calculation overhead can be greatly reduced while ensuring information security.

The invention overcomes some of the shortcomings of the existing image privacy perception methods on one hand, and on the other hand, extends the perception of privacy to the perception of the image privacy regions to meet different needs. Compared with the traditional privacy perception methods, the invention only trains image content features and categories, is not restricted by user-defined image tags and access policies, and can play a role in various application scenarios. In the meantime, the invention makes use of the deep convolution network, which has stronger feature expression capability than the traditional feature extraction method, and increases the classification accuracy and generalization capability of the model.

The image privacy perception method based on deep learning provided by the invention has following advantages.

First, a good prerequisite is provided for image privacy protection. The invention proposes an automatic privacy perception mechanism, which can perceive the images and the local privacy of images, meeting the diversified needs of image privacy protection. The privacy image can be selectively protected under the premise of ensuring the privacy security of the user, greatly saving the computation overhead for privacy protection.

Second, the privacy perception data set built in the invention contains images obtained by searching according to a large number of privacy corpus, so that the model can perceive various common privacy categories including ID photos, file snapshots, and the like, and has strong universality.

Third, an end-to-end manner is adopted in the training and testing phases (with an original picture at an input end and a perception result at an output end, no human intervention is needed), and the privacy images and the image privacy regions are perceived by the same model, which is easy to use and can be easily applied to a variety of practical applications.

Fourth, the optimization strategy of bilinear operation is introduced to further improve the feature expression capability on the basis of the original model, favorably improving the image perception accuracy rate and bringing a great benefit to the locating of the privacy region.

The description above provides further detailed illustration of the invention in conjunction with the particular preferred embodiments, and should not be construed as limited to these embodiments set forth herein. For those of ordinary skills in the art of the invention, several simple deductions or replacements can also be made without departing from the conception of the invention, and should be construed as falling within the protection scope of the invention.

What is claimed is:

1. An image privacy perception method based on deep learning, comprising the following steps:

S1, building a privacy classification data set with labeled categories, and training a privacy perception network with a transfer learning method, comprising:

pre-training a deep convolutional neural network model over a large-scale image data set;

fine-tuning the pre-trained deep convolutional neural network model to generate the privacy perception network, comprising:

adding a bilinear operation layer posterior to a last convolutional layer of the pre-trained deep convolutional neural network model to enhance a feature expressing capability of the pre-trained deep convolutional neural network model, and meanwhile changing a fully connected layer of the pre-trained deep convolutional neural network model into a pooling layer to generate the privacy perception network; and training the privacy perception network over the privacy classification data set;

S2, recognizing a privacy image using the trained privacy perception network oriented to privacy perception; and S3, extracting an attention profile according to deep convolutional features of the trained privacy perception network, and locating an attention focusing region to complete a perception of an image privacy region.

2. The image privacy perception method based on deep learning according to claim 1, wherein S3 comprises: obtaining a weighted high level feature map as the attention profile according to a correspondence between the weight of each node of the pooling layer and feature maps subjected to bilinear operation, and locating privacy regions in the original maps through scale changing.

3. The image privacy perception method based on deep learning according to claim 1, wherein the bilinear operation layer mainly calculates a dot product of every two convoluted feature maps, supposing an original feature map set $M=\{m_1, m_2, \ldots, m_n\}$, and an output bilinear feature map set $M'=\{m'_1, m'_2, \ldots, m'_{n \times n}\}$, then a conversion formula is:

$$m'_i = m_{\lceil i/n \rceil} \circ m_{i-(\lceil i/n \rceil - 1) \times n} \qquad (1)$$

wherein "$\circ$" represents the dot product of matrixes, "$\lceil \ \rceil$" represents rounding up to an integer, n indicates the number of the original feature maps, and i indicates the subscript of the bilinear feature map.

4. The image privacy perception method based on deep learning according to claim 3, wherein the bilinear feature maps are subjected to dimensionality reduction.

5. The image privacy perception method based on deep learning according to claim 4, wherein a Tensor Sketch algorithm is used to perform the dimensionality reduction on the bilinear feature maps.

6. The image privacy perception method based on deep learning according to claim 5, wherein the bilinear feature maps are c matrixes of w*h, with an input of the Tensor Sketch algorithm as a vector, each position in the bilinear feature maps is calculated in turn when using the Tensor Sketch algorithm, that is, c-dimensional vectors are subjected to operation respectively and remapped to a space of w*h*d dimensions; parameter sets $h_k \in \{1, \ldots, d\}^c$, $s_k \in \{1, -1\}^c$ (k=1, 2) are first generated randomly for hash operation, wherein $h_k$ is used for storing an index for remapped input vectors, and $s_k$ accomplishes random negation for each elemental value of the input vectors; according to the parameter sets, a remapped Count Sketch vector is obtained through accumulation; from the convolution theorem, the convolution of a time domain or a spatial domain is known to be equal to a product in a corresponding frequency domain; and thus, two Count Sketch vectors are converted into the frequency domain using the fast Fourier transform to find a product thereof in the frequency domain, and then converted back to the spatial domain through the inverse Fourier transform to calculate the convolution of the Count Sketch vectors.

7. The image privacy perception method based on deep learning according to claim 5, wherein the fully connected layer is changed into an average pooling layer, which pools all of the feature maps and averages the elements in each feature map to obtain a vector of the d-dimension finally.

8. The image privacy perception method based on deep learning according to claim 7, wherein a correspondence exists between nodes of the average pooling layer and the feature maps, which are subjected to weighted summation to obtain the attention profile;

supposing a dimension-reduced bilinear feature diagram sequence $P=\{p_1, p_2, \ldots, p_d\}$, and the finally generated attention profile as A, then a calculation formula thereof is:

$$A = \sum_k w_k^n p_k \quad (2)$$

wherein n is a category label subordinated to classified input images, and $w_k^n$ indicates a connection weight of a category n corresponding to the $k^{th}$ node of the pooling layer;

the privacy image is locally located according to the results above, to be specific, the attention profile obtained from the steps above is changed in scale and converted into the size of the original profile, a threshold is set to complete image binarization, and a minimal external matrix of the binaryzed image is solved as a local perception result of the privacy image.

* * * * *